(12) United States Patent
Addington (10) Patent No.: US 8,024,766 B2
(45) Date of Patent: Sep. 20, 2011

(54) SYSTEM AND METHOD FOR DISTRIBUTING NETWORK-BASED PERSONAL VIDEO

(75) Inventor: Timothy H. Addington, Roswell, GA (US)

(73) Assignee: Ericsson Television, Inc., Duluth, GA (US)

( * ) Notice: Subject to any disclaimer, the term of this patent is extended or adjusted under 35 U.S.C. 154(b) by 1715 days.

(21) Appl. No.: 10/210,278

(22) Filed: Aug. 1, 2002

(65) Prior Publication Data
US 2003/0028893 A1  Feb. 6, 2003

Related U.S. Application Data

(60) Provisional application No. 60/309,369, filed on Aug. 1, 2001.

(51) Int. Cl.
*H04N 7/173* (2006.01)
(52) U.S. Cl. .............. 725/116; 725/88; 725/91; 725/92; 725/115; 725/144; 725/145
(58) Field of Classification Search .................... 725/88, 725/91, 92, 115, 116, 144, 145
See application file for complete search history.

(56) References Cited

U.S. PATENT DOCUMENTS

| | | |
|---|---|---|
| 5,404,516 A | 4/1995 | Georgiades et al. |
| 5,412,720 A | 5/1995 | Hoarty |
| 5,485,219 A | 1/1996 | Woo |
| 5,790,173 A | 8/1998 | Strauss et al. |
| 5,805,804 A | 9/1998 | Laursen et al. |
| 5,815,662 A | 9/1998 | Ong |
| 5,861,906 A | 1/1999 | Dunn et al. |
| 5,920,700 A | 7/1999 | Gordon et al. |
| 5,923,362 A | 7/1999 | Klosterman |
| 6,005,603 A | 12/1999 | Flavin |
| 6,119,154 A | 9/2000 | Weaver et al. |
| 6,141,488 A * | 10/2000 | Knudson et al. ................ 386/83 |
| 6,181,336 B1 | 1/2001 | Chiu et al. |
| 6,201,536 B1 | 3/2001 | Hendricks et al. |
| 6,357,042 B2 * | 3/2002 | Srinivasan et al. .............. 725/32 |
| 6,389,538 B1 | 5/2002 | Gruse et al. ................... 713/194 |
| 6,536,868 B1 | 3/2003 | Kawamura et al. ............. 347/40 |
| 6,574,655 B1 | 6/2003 | Libert et al. ................... 709/200 |
| 6,587,837 B1 | 7/2003 | Spagna et al. .................. 705/26 |

(Continued)

FOREIGN PATENT DOCUMENTS
EP         0727908         8/1996
(Continued)

OTHER PUBLICATIONS

International Search Report for related PCT Patent Application No. PCT/US02/06971, filed Mar. 7, 2002.

(Continued)

*Primary Examiner* — Brian Pendleton
*Assistant Examiner* — Nnenna Ekpo (57) ABSTRACT

A personal video service manager can store one or more personal video assets on a server. A personal video asset can include a recording of a broadcast stream of a broadcast asset or an asset that has been pre-authored in a personal video asset format. Upon receiving a request from a subscriber to receive the personal video asset, the personal video service manager can facilitate a connection between the server and the subscriber for distributing the personal video asset from the server to the subscriber.

30 Claims, 7 Drawing Sheets

U.S. PATENT DOCUMENTS

| | | | |
|---|---|---|---|
| 6,718,551 B1 * | 4/2004 | Swix et al. | 725/32 |
| 6,760,721 B1 | 7/2004 | Chasen et al. | 707/3 |
| 6,912,567 B1 | 6/2005 | Allard et al. | |
| 6,959,288 B1 | 10/2005 | Medina et al. | |
| 6,985,694 B1 * | 1/2006 | De Bonet et al. | 455/3.01 |
| 7,055,166 B1 * | 5/2006 | Logan et al. | 725/32 |
| 2001/0013127 A1 | 8/2001 | Tomita et al. | |
| 2002/0010936 A1 | 1/2002 | Adam | |
| 2002/0083469 A1 * | 6/2002 | Jeannin et al. | 725/135 |
| 2002/0092022 A1 | 7/2002 | Dudkicwicz et al. | |
| 2002/0178211 A1 | 11/2002 | Singhal et al. | |
| 2005/0283810 A1 * | 12/2005 | Ellis et al. | 725/93 |

FOREIGN PATENT DOCUMENTS

| | | |
|---|---|---|
| EP | 1146731 | 10/2001 |
| WO | WO 01/60767 | 8/2001 |
| WO | WO 02/45423 | 6/2002 |

OTHER PUBLICATIONS

International Search Report for related PCT Patent Application No. PCT/US02/16469, filed May 24, 2002.

International Search Report for PCT Patent Application No. PCT/US02/24394, filed Aug. 1, 2002.

TVN's MSO Client List Grows; Matt Stump, Multichannel News, Mar. 18, 2002.

TVN Delivers Charter, Comcast, Matt Stump, Multichannel News, Jul. 15, 2002.

From MajorNewswire.com; Arts & Entertainment; Major Cable Nets Choose TVN for VOD Services; Dec. 2, 2002.

TVN's Secure Satellite Transport System Endorsed by Movie Studios and Event Distributors; Burbank, Calif., Nov. 28, 2000.

Hwang, "Protocol for Collaborative Multimedia Presentations", Multimedia and Expo, 2000. ICME 2000. 2000 IEEE International Conference, New York, New York, USA, Jul. 30, 2000.

Shah et al.; *Logical Information Modeling of Web-accessible Heterogeneous Digital Assets*; Research and Technology Advances in Digital Libraries; 1998; ADL 98; Proceeding International Forum on Apr. 22-24, 1998; pp. 266-275.

PCT International Search Report, PCT/US04/41784, Feb. 8, 2006.

* cited by examiner

SYSTEM AND METHOD FOR DISTRIBUTING NETWORK-BASED PERSONAL VIDEO

PRIORITY CLAIM TO PROVISIONAL APPLICATION

This application claims benefit of priority to U.S. Provisional Application Ser. No. 60/309,369 entitled "Method and System for Network-Based Personal Video," filed Aug. 1, 2001. The subject matter of U.S. Provisional Application Ser. No. 60/309,369 is hereby fully incorporated herein by reference.

FIELD OF THE INVENTION

The present invention is generally directed to video networks. More particularly described, the present invention supports the management and the distribution of personal video assets upon receiving requests from cable subscribers to view the personal video assets.

BACKGROUND OF THE INVENTION

Recent developments in the cable television industry have allowed content providers (or "asset providers"), such as Home Box Office, NBC, and Warner Bros., to provide a variety of cable television services to cable subscribers. For example, a Movie-on-Demand service allows a cable subscriber to view a movie over the cable network with the same type of control that a person typically has over a video cassette recorder ("VCR") or digital versatile disk ("DVD") player. More specifically, the Movie-on-Demand service allows a cable subscriber to view a movie over the cable network at any time and to control the delivery of the movie using fast-forward, stop, pause, or rewind functions. However, one limitation of conventional Movie-on-Demand services is that content providers must pre-package Movie-on-Demand assets in a Movie-on-Demand format and distribute the asset to each cable headend that will make the asset available to cable subscribers. In other words, cable subscribers can only request to view those assets that have been specifically formatted by the content providers for Movie-on-Demand viewing and distributed to one or more cable headends.

In addition, the television industry has recently witnessed the introduction of Personal Video Recorder ("PVR") devices, which allow subscribers to record television content and to view the recorded content at a later time. In the conventional art, a PVR device installed in a subscriber's home can record and store television content in digital format on the hard disk of the PVR device. In this way, a subscriber can control the delivery of recorded television content using stop, pause, rewind, and fast forward commands similar to those used on a VCR or DVD player.

PVR devices, however, have several limitations. First, a PVR device is limited in the amount of digital television content it can store on its hard disk. Additionally, a cable subscriber must first manually pre-select the television content it wants to record (or the PVR device must record the television content according to a pre-defined profile for the cable subscriber) before the cable subscriber can actually view the recorded television content at a later time. In other words, a cable subscriber cannot view at a later time any television content that has not been previously recorded by the PVR device. Moreover, a PVR device is limited to the number of television programs it can record at one time by the number of tuners it has available.

Additionally, once a PVR device records television content, content providers no longer have any control over the delivery of the content. For example, when viewing television content recorded on the PVR device, cable subscribers can avoid viewing television commercials by fast-forwarding past them. Similarly, once the television content is recorded, the content providers and the cable headends can no longer supplement old television commercials with newer television commercials based upon when the cable subscriber chooses to view the recorded television content. Finally, the cost of installing and maintaining PVR devices in the customers' homes is very expensive compared to the current class of digital set top boxes used to provide television services.

Consequently, there is a need in the art for a system and method that allows a cable subscriber to select and view television content on-demand at any time without first requiring the cable subscriber to have recorded the television content on an in-home recording device. Additionally, there is a need in the art for a system and method that does not limit the amount of television content that a cable subscriber can view on-demand. Similarly, there is a need in the art for a system and method that does not limit when a cable subscriber can view television content. Finally, there is a need in the art for a system and method that allows a content provider or cable headend to maintain control over television content that is made available for on-demand viewing by cable subscribers.

SUMMARY OF THE INVENTION

The present invention can solve the aforementioned problems by providing a system and method for managing one or more personal video assets. In one aspect of the present invention, a personal video service manager can store one or more personal video assets on a server. A personal video asset can comprise a recording of a broadcast stream of a broadcast asset or an asset that has been pre-authored in a personal video asset format. Upon receiving a request from a subscriber to receive the personal video asset, the personal video service manager can facilitate a connection between the server and the subscriber for distributing the personal video asset from the server to the subscriber.

Various aspects of the present invention may be more clearly understood and appreciated from a review of the following detailed description of the disclosed embodiments and by reference to the drawings and claims.

DETAILED DESCRIPTION OF EXEMPLARY EMBODIMENTS

Although the illustrative embodiments will be generally described in the context of the cable television industry, those skilled in the art will recognize that other exemplary embodiments of the present invention may be implemented for any application in which assets are made available upon receiving a request from an entity to view or receive the asset. Moreover, those skilled in the art will also recognize that an asset can comprise any type of media content, including and not limited to MP3 files, digital video files, digital audio or music files, and other digital media and multimedia content.

In one exemplary embodiment of the present invention, one or more asset providers can distribute one or more media broadcast assets, such as television movies, television series, television episodes, commercials, news programs, sporting events, other broadcast events and programs, or a combination thereof, to one or more exemplary receivers (typically located at cable headends), for further distribution to an audience, such as cable subscribers. An asset provider can comprise any entity that distributes the asset to one or more receivers. An exemplary receiver at a cable headend can receive assets from one or more asset providers. The cable headend can record a broadcast asset or a portion of a broadcast asset as it is aired to cable subscribers using processing and recording equipment. Each recorded broadcast asset can then be formatted for viewing as a personal video asset and stored on exemplary centralized personal video content servers. The cable headend can also receive broadcast assets directly from an asset provider that have already been formatted by the asset provider for viewing as a personal video asset. Stated differently, an asset provider can "pre-author" a broadcast asset in a personal video asset format and send the pre-authored asset to one or more cable headends. The cable headend can store the personal video assets (whether they are pre-authored assets or whether they are recordings of previously-aired broadcast assets) on one or more centralized personal video content servers.

An exemplary personal video service manager can control the delivery and distribution of personal video assets from the centralized personal video content servers throughout the personal video network. In one exemplary embodiment of the present invention, the personal video service manager can direct the recording and processing equipment to record a broadcast asset or a portion of a broadcast asset as it is aired to cable subscribers, and can store the recorded broadcast asset as a personal video asset in a centralized personal video content server. The personal video service manager can determine which personal video assets stored in the centralized personal video content servers to distribute to exemplary distributed personal video servers. For example, distributed personal video servers can be used to store the most frequently viewed or requested personal video assets. Each distributed personal video server can service one or more service groups of cable subscribers. In this way, a cable subscriber can have access to the personal video assets stored on the distributed personal video server that services its service group and to the personal video assets stored on the centralized personal video content servers.

The personal video service manager can also receive a request to view a particular personal video asset from a cable subscriber. In response to receiving the request, the personal video service manager can determine whether the cable subscriber is authorized to view the requested personal video asset. If the cable subscriber is authorized to view the personal video asset, the personal video service manager can connect the requesting cable subscriber to the cable subscriber's distributed personal video server, if the personal video asset is stored on the distributed personal video server. If the personal video asset is not stored on the distributed personal video server, then the personal video service manager can connect the requesting cable subscriber to the centralized personal video content server on which the personal video asset is stored. In another exemplary embodiment of the present invention, upon receiving a request from the cable subscriber, the personal video service manager can send the personal video asset from the centralized personal video content server via an exemplary transmitter to a receiver that services the service group to which the requesting cable subscriber belongs and can store the personal video asset on the distributed personal video server that services the cable subscriber. The personal video service manager can then connect the requesting cable subscriber to the distributed personal video server on which the personal video asset has been stored.

Once the personal video service manager connects the requesting cable subscriber to the server on which the personal video asset is stored, the personal video service manager can build a personalized playlist that instructs the server how to play the personal video asset for the requesting cable subscriber. For example, the personalized playlist can instruct the server to play the personal video asset with other assets, such as with targeted advertisements. In other words, the personal video service manager can instruct the server to play certain advertisements with the personal video asset based upon a cable subscriber's profile, geographic location, age, or based upon any other demographic information.

Additionally, a personalized playlist can instruct the server how much control a cable subscriber has in viewing the personal video asset. For example, a cable subscriber may have unlimited control in navigating through the viewing of a personal video asset and the advertising associated with the personal video asset. On the other hand, a cable subscriber may have unlimited control in navigating through the viewing of the personal video asset but have no control in navigating through (or skipping) advertisements associated with the personal video asset.

Referring now to the drawings in which like numerals represent like elements throughout the several figures, exemplary embodiments of the present invention and the illustrative operating environment will be described.

Figure 1:
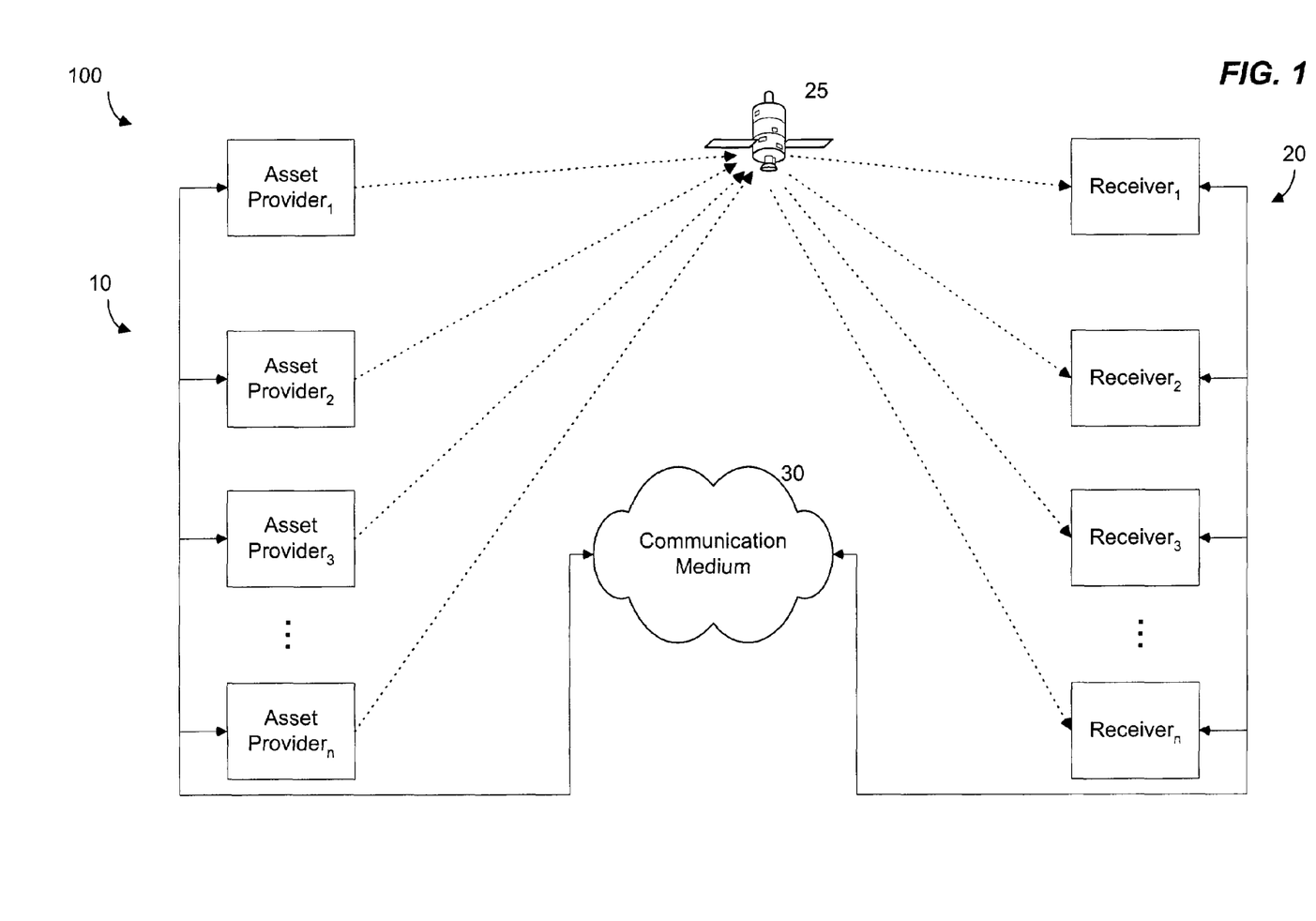
FIG. 1 is a functional block diagram illustrating an exemplary environment in which assets are distributed by multiple asset providers to multiple receivers.

FIG. 1 is a functional block diagram illustrating an exemplary environment 100 in which assets are distributed by multiple asset providers 10 to multiple receivers 20. Though individual components are illustrated in the exemplary environment of FIG. 1, multiple components can be employed without departing from the scope and spirit of the present invention.

The exemplary environment 100 can comprise one or more asset providers 10 and receivers 20 coupled to a communications medium 30 and operative to communicate with a satellite 25. Asset providers 10 with a finite number of asset delivery resources can distribute assets to the receivers 20 over various types of network technologies. The asset providers 10 can distribute assets to the receivers 20 via the satellite 25 or an alternative communications link 30 using a broadcast, multicast, or unicast communications methodology. Receivers 20 with a finite number of available resources receive assets from one or more asset providers 10 at cable headends. In one exemplary embodiment, a receiver 20 receives assets from multiple asset providers 20 via multiple satellite transponders at varying times. In another exemplary embodiment, a receiver 20 receives assets from multiple asset providers 20 via multiple satellite transponders concurrently. In other exemplary embodiments, the receiver 20 can comprise multiple receivers 20, or the receiver 20 can receive assets from other receivers 20 via an IP or other communication network 30, or the receiver 20 can comprise multiple receivers 20 and receive assets from other receivers 20 via a communication network 30.

Figure 2A:
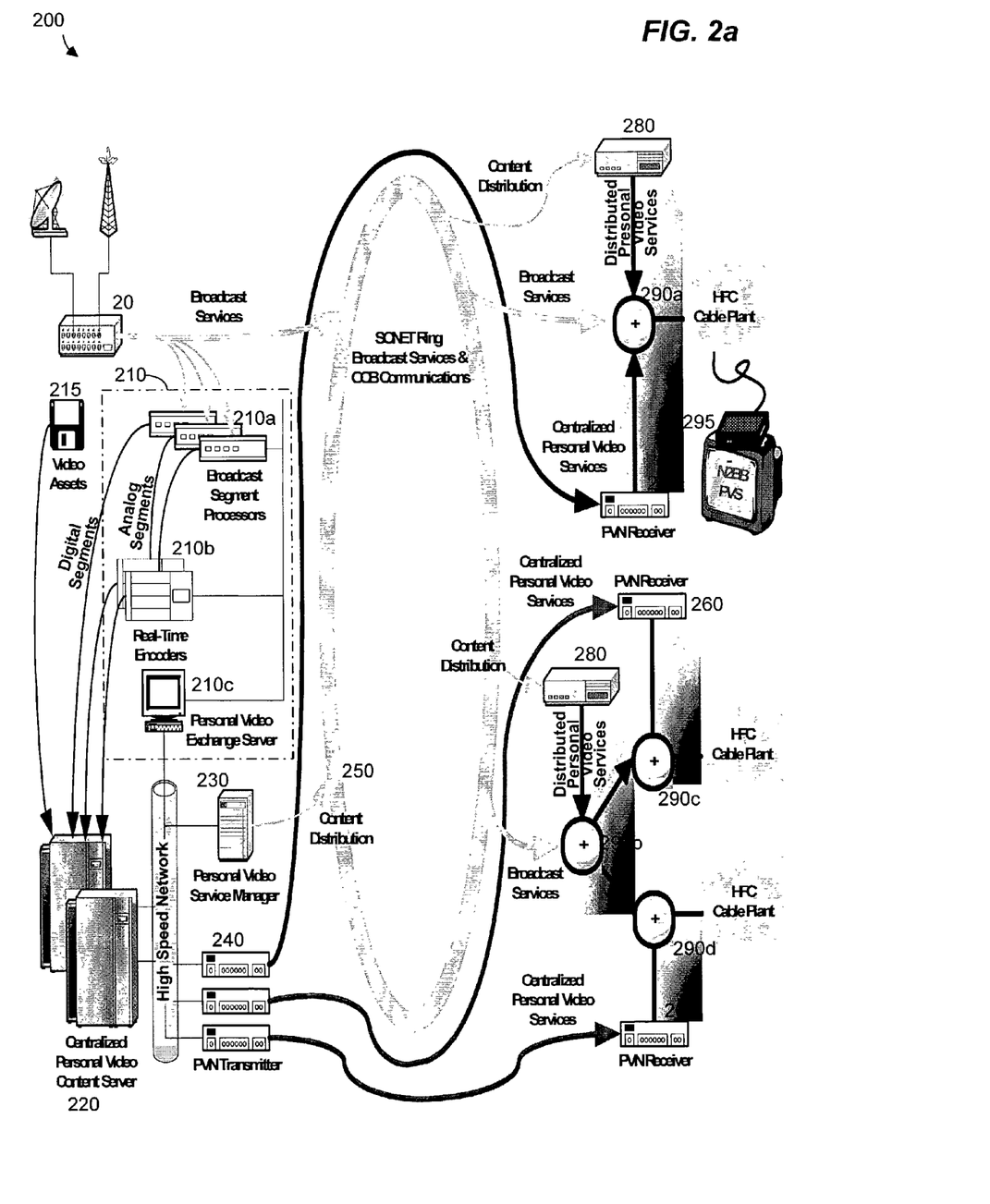
FIG. 2a is a functional block diagram illustrating an exemplary operating environment for a personal video network in accordance with one exemplary embodiment of the present invention.

FIG. 2a is a functional block diagram illustrating an exemplary operating environment for a personal video network 200 in accordance with one exemplary embodiment of the present invention. Though individual components are illustrated in the exemplary environment of FIG. 2a, multiple components can be employed without departing from the scope and spirit of the present invention.

The personal video network 200 comprises a receiver 20, which receives assets from one or more asset providers 10 at a cable headend. The cable headend distributes the assets via a distribution network 250 to cable subscribers 295. The cable headend also records each media asset as it is aired (or specific media assets as they are aired) to cable subscribers 295 using processing and recording equipment 210. In one exemplary embodiment, processing and recording equipment 210 located at a headend comprises a broadcast segment processor 210a, a real-time encoder 210b, a personal video exchange server 210c, and a live spool (not shown). A broadcast segment processor 210a extracts a portion of a broadcast stream of a broadcast asset. A real time encoder 210b formats the broadcast stream into a format that allows the extracted portion of the broadcast asset to be viewed upon request by a cable subscriber 295. In one exemplary embodiment, the real time encoder 210b receives analog audio and video broadcast streams and converts the analog audio and video streams into Moving Picture Experts Group (MPEG) video and Dolby audio files. In another exemplary embodiment, the real time encoder 210b receives digital broadcast streams and formats the received digital broadcast stream to a compatible digital format for on-demand viewing by cable subscribers 295. The extracted and formatted portion of the broadcast asset can be stored in a personal video exchange server 210c.

More specifically described, segments of a media asset are tagged with metadata, which describes each segment in a manner that allows a broadcast segment processor 210a to extract the segments and store the segments for later playback. The asset provider 10 adds the metadata describing a segment of the media asset to the broadcast stream. The authoring of the metadata by the asset provider 10 may occur either before the media asset is broadcast or after the media asset has been broadcast. The segments that are extracted by the broadcast segment processor 210a may be used for various purposes, including but not limited to applications that comprise on-demand viewing, advertisement-insertion, local affiliate archiving, and distance learning applications.

Figure 2B:
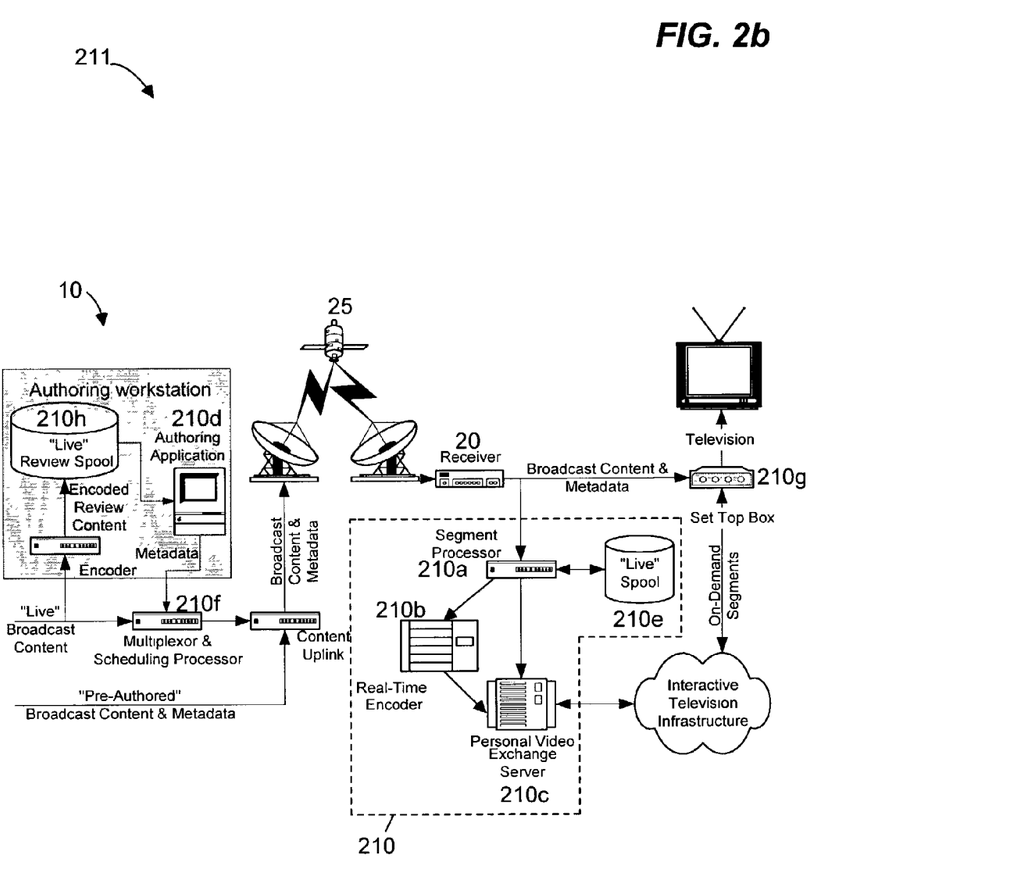
FIG. 2b is a functional block diagram illustrating an exemplary environment in which segments of a media asset are extracted and stored at a headend.

FIG. 2b is a functional block diagram illustrating an exemplary environment 211 in which segments of a media asset are extracted and stored at a headend. Though individual components are illustrated in the exemplary environment of FIG. 2b, multiple components can be employed without departing from the scope and spirit of the present invention.

An asset provider 10 comprises an authoring application 210d. Using the authoring application 210d, the asset provider 10 produces the metadata files that are inserted into a broadcast stream. Metadata comprises either stream metadata or segment package metadata. Stream metadata is used to deliver instructions to the broadcast segment processor 210a located at the headend. The stream metadata defines the physical attributes of a segment, such as start time code, duration, and encoding parameters. The asset provider 10 determines the segment's start time code and its duration using standard time codes or other industry standard authoring mechanisms.

The broadcast segment processor 210a uses the stream metadata to determine which segments of a media asset are to be packaged and archived. In other words, the metadata defines which segments the broadcast segment processor 210a should extract. Stream metadata commands include but are not limited to live spool cache controls, real-time encoder 210b controls, and segment creation controls. In one exemplary embodiment, the stream metadata is represented in XML format.

Segment package metadata comprises the identity and lifecycle of a package. This metadata is packaged with the segments of a media asset to create a segment package. The segment identity information provides information about the segment and is used to build a catalog of stored segments. The catalog may be presented to a subscriber so that he or she can select a segment for viewing on-demand. The segment lifecycle information determines the amount of time that a segment is stored in the personal video exchange server 210c and the times when the segment may be viewed by a cable subscriber 295. In one exemplary embodiment, package metadata is represented in XML format. Additionally, in one exemplary embodiment, the package metadata is transmitted either in-band with the segment or out-of-band in a separate transport stream and may be sent at any time before the segment is broadcast.

If the starting time-code and duration of the segment is known before the segment is broadcast, the asset provider 10 can pre-author the metadata and schedule the metadata for insertion at the appropriate time. If the pre-authored metadata is sent before the segment is broadcast, the broadcast segment processor 210a captures the described segment from the broadcast stream and sends it to the personal video exchange server 210c for storage.

On the other hand, if the pre-authored metadata is sent during or after the segment broadcast has started and the segment is being cached in a live spool 210e at the headend, the segment is packaged from the live spool 210e and sent to the personal video exchange server 210c. In other words, if permitted by the asset provider 10, the live spool 210e stores a portion of the broadcast. This spooled data may be real-time encoded or re-encoded to a different format as it is being spooled if necessary. In one exemplary embodiment, if storage space on the live spool 210e is exhausted, as new content is received by the live spool 210e, the oldest content is removed from the live spool 210e. Nonetheless, the asset provider 10 may provide stream metadata that modifies this first-in-first-out algorithm of the live spool 210e. For example, an asset provider 10 can send an instruction to the live spool 210e to save a portion of a broadcast stream in the live spool 210e for a specified period of time. Thus, the saved portion of the broadcast stream will not be deleted by the live spool 210e when new content arrives.

An exemplary multiplexor and scheduling processor 210f determines how the segments are managed and extracted at the headend. For example, the multiplexor and scheduling processor 210f determines when a particular metadata file is inserted into the broadcast stream. Specifically, the multiplexor and scheduling processor 210f determines when the metadata for a segment is combined into the transport stream, how often metadata is sent, and how the metadata is sent. In one exemplary embodiment, in the case of an analog broadcast, the metadata is inserted into the vertical blanking interval (VBI) portion of the programming using the ATVEF specification. However, other mechanisms for inserting metadata can be used. In another exemplary embodiment, in the case of digital broadcast, the metadata is sent as private data in a Moving Pictures Expert Group (MPEG) transport stream. For example, this metadata may be sent in an elementary stream comprising private data. The elementary stream may be associated with a specific program (i.e. CNN metadata sent in the CNN transport stream); with the entire multiplex (i.e. CNN, CNNfn, CNNsi, CNNhn, etc); or an elementary stream in a separate transport stream (i.e. metadata for multiple transport streams sent in a transport stream that carries an elementary stream for this metadata), in which a single receiver 20 is tuned to different transport streams to extract segments. The metadata can be inserted into the MPEG transport stream using the ATVEF specification. However, other mechanisms for inserting metadata can be used without departing from the scope of the present invention. In another exemplary embodiment, metadata is sent through a transport mechanism that is not a part of the broadcast channel. For example, the multiplexor and scheduling processor 210f sends the metadata to a receiver 20 over a wide area network (WAN) connection such as the Internet.

Additionally, the multiplexor and scheduling processor 210f controls the operation of the live spool 210e at the headend, and it determines which assets and how many assets are available in the live spool 210e. The multiplexing and scheduling processor 210f also maintains a log of all changes made to metadata.

If the channel being scheduled supports a segment cache at the headend, segments may be authored from a broadcast stream. The authoring application 210d spools the broadcast stream into a local live spool 210h along with the time codes associated with the broadcast time codes. The asset provider 10 uses this spooled content to determine the details of segments to be generated. For channels that can cache broadcast streams in a live spool 210e at the headend, the metadata may also be sent after the segment has started. The time period that the metadata may be sent depends on the amount of storage in the live spool 210e at the headend.

Those skilled in the art will recognize that the metadata and content may be delivered over communications networks other than satellite multicast or broadcast networks without departing from the scope or spirit of the present invention, and that applications other than video services may also be provided or enabled without departing from the scope and spirit of the present invention. For example, the metadata may be distributed separately from the broadcast content, such as via an IP network or other communications network.

The headend delivers the broadcast stream to a broadcast segment processor 210a that extracts metadata and segments of the broadcast stream to create segment packages for later playback. Specifically, a broadcast segment processor 210a at the headend extracts the segments from the stream and stores the segments in a personal video exchange server 210c. The stream metadata that the broadcast segment processor 210a receives comprises the scheduling information for segments that it packages. The stream also comprises segment package metadata that has lifecycle and identity information about the segment.

When the time for a scheduled segment arrives, the broadcast segment processor 210a selects the appropriate transport stream and captures the segment for the scheduled amount of time. The content is, if necessary, converted by a real-time encoder 210b to the appropriate format for storage. Specifically, the converted content and its associated metadata are packaged into a segment package and delivered to a personal video exchange server 210c for storage. In one exemplary embodiment, the segment package is distributed using Pegasus Asset Distribution Interface (ADI). In other exemplary embodiments, other distribution mechanisms may be used.

The broadcast segment processor 210a also maintains a log of segments that are received and any errors that are encountered. A log is maintained as segments are converted and delivered to one or more personal video exchange servers 210c. The segments are stored in a package format that comprises the segment of the media asset and the package metadata extracted from the broadcast metadata that describes the segment package.

If a live spool 210e is used to cache broadcast content, the broadcast segment processor 210a may be instructed to convert all content received during a period of time and pass the converted content to the live spool 210e along with any package metadata. A live spool 210e allows the asset provider 10 to determine if a segment should be packaged and added to the personal video exchange server 210c after the content has been broadcast. The live spool 210e stores all content passed to it from the broadcast segment processor 210a using the same time codes that were broadcast with the original content. Additionally, the live spool 210e allows the asset provider 10 to determine the start time, duration, and package metadata of the segment after it has been delivered.

The personal video exchange server 210c maintains an archive of the segment packages that are received from the broadcast segment processor 210a and the associated lifecycle and identity metadata. These segments are maintained according to the lifecycle metadata. This metadata determines when the segment may be played and when the segment should be deleted from the personal video exchange server 210c.

Additionally, the personal video exchange server 210c maintains a log of all segment activity, including the addition and deletion of segments, changes to configuration, and each time the segment is played. The personal video exchange server 210c may also be connected to a billing/authorization system that determines who may play a segment and how much to charge for the playing of that segment. In another exemplary embodiment, a set-top box 210g may store the lifecycle and identity metadata instead of the personal video exchange server 210c. In yet another exemplary embodiment, a distribution network hub or node (such as a digital cable TV network hub or node) may store the lifecycle and identity metadata instead of the personal video exchange server 210c.

Referring back to FIG. 2a, once the media asset is recorded by the processing and recording equipment 210, the recorded media asset is then formatted for viewing as a personal video asset and stored on centralized personal video content servers 220. For example, the cable headend can format how long the personal video asset will be available to cable subscribers 295 in the personal video network 200, which cable subscribers 295 or group of cable subscribers 295 can have access to the personal video asset, and the amount of control a cable subscriber 295 has in viewing the personal video asset or in skipping over commercials associated with the personal video asset.

In another exemplary embodiment of the present invention, the cable headend receives pre-authored personal video assets 215 directly from an asset provider 10 and stores the personal video assets on the centralized personal video content server 220. Thus, the asset provider 10 can format how long the personal video asset will be available to cable subscribers 295 in the personal video network 200, which cable subscribers 295 or group of cable subscribers 295 can have access to the personal video asset, and the amount of control a cable subscriber 295 has in viewing the personal video asset or in skipping over commercials associated with the personal video asset.

A formatted personal video asset comprises the actual asset and metadata that describes the format of the asset. The asset may be stored as a single file, or it may be segmented into multiple pieces. The metadata that describes the personal video asset comprises a default playlist for that asset. The default playlist informs the personal video service manager 230 how advertisements, or other assets, can be inserted into (or associated with) the personal video asset. For example, if the asset is stored as a single file, the default playlist comprises an index that indicates each location in the file where advertisements may be inserted during playback to a cable subscriber 295 who has requested to view the personal video asset. In the case of multiple segments, the metadata may simply comprise a list of the segments. In the segmented model, advertisements can be inserted between the segments. The metadata associated with a single file or a segmented file also comprises information as to the amount of time available for the insertion of advertisements.

Additionally, the default playlist controls how the cable subscriber 295 navigates through the asset. For example, a cable subscriber 295 can navigate through the personal video asset without any limitation. Thus, the cable subscriber 295 can fast-forward or rewind through the personal video asset and the advertisements displayed with the personal video asset. On the other hand, if the personal video asset is advertisement-supported, the playlist may insert a number of advertisements around certain segments of the personal video asset. In this case, the default playlist may comprise instructions that prevent the cable subscriber 295 from skipping any advertisements but allow the cable subscriber 295 to navigate through the personal video asset itself without limitation. In other cases, the default playlist comprises instructions that prohibit the cable subscriber 295 from navigating through the personal video asset or the advertisements associated with the personal video asset entirely.

Based upon the default playlist, the personal video service manager 230 can build a personalized playlist for the requested personal video asset, which instructs a video server, such as a centralized personal video content server 220 or a distributed personal video server 280, how to assemble the segments when the asset is played out to the requesting cable subscriber 295. Additionally, the personal video service manager 230 determines which assets (such as targeted advertising), if any, are to be inserted into (or associated with) the personal video asset. In one exemplary embodiment of the present invention, the personal video service manager 230 makes this determination based upon the personal video asset requested and the cable subscriber's subscription service. In another exemplary embodiment, the personal video service manager 230 makes this determination based upon any instructions it has from (or contracts it has with) the asset provider 10 that provided the cable headend with the personal video asset.

Additionally, the personal video service manager 230 can specify in the personalized playlist how the requesting cable subscriber 295 can navigate through the personal video asset and advertisements associated with the personal video asset. For example, in creating the personalized playlist, the personal video service manager 230 can prohibit the requesting cable subscriber 295 from skipping through the advertisements associated with the personal video asset, even if the default playlist generally permits cable subscribers 295 to navigate through advertisements without limitation.

The centralized personal video content servers 220 store all of the personal video assets available in the personal video network 200. One or more centralized personal video content servers 220 are located at the cable headend. A personal video service manager 230 controls the delivery and distribution of personal video assets from the centralized personal video content servers 220 throughout the personal video network 200. The personal video service manager 230 determines which personal video assets stored in the centralized personal video content servers 220 to distribute to distributed personal video servers 280. In one exemplary embodiment of the present invention, distributed personal video servers 280 are used to store the personal video assets that are most frequently viewed or most frequently requested by cable subscribers 295. By using distributed personal video servers 280 throughout the personal video network 200, less bandwidth is needed between the cable headend and cable subscribers 295 to distribute personal video assets. In other words, by storing the most popular personal video assets throughout the personal video network 200 on distributed personal video servers 280, the cable headend will need to distribute fewer personal video assets from the centralized personal video content servers 220 to the cable subscribers 295 in response to receiving requests for personal video assets that are stored on the centralized personal video content servers 220.

Each distributed personal video server 280 services one or more service groups of cable subscribers 295. Thus, a cable subscriber 295 has access to the personal video assets stored on the distributed personal video server 280 that services its service group and to the personal video assets stored on the centralized personal video content servers 220. Additionally, each distributed personal video server 280 may store a unique combination of personal video assets. For example, a personal video service manager 230 may decide which personal video assets to distribute from the centralized personal video content servers 220 to each distributed personal video server 280 depending upon the demographic of the service group associated with the distributed personal video server 280 or based upon the personal video assets that are typically requested by the service group associated with the distributed personal video server 280.

The personal video service manager 230 also receives a request to view a particular personal video asset from a cable subscriber 295. In response to receiving the request, the personal video service manager 230 determines whether the cable subscriber 295 is authorized to view the requested personal video asset. Whether a cable subscriber 295 is authorized to view a particular personal video asset may depend upon the cable subscriber's cable subscription. If the cable subscriber 295 is authorized to view the personal video asset, the personal video service manager 230 determines where the personal video asset is stored in the personal video network 200. If the personal video asset is stored on the distributed personal video server 280 that services the cable subscriber's service group, then the personal video service manager 230 connects the requesting cable subscriber 295 to the cable subscriber's distributed personal video server 280. If the personal video asset is not stored on the distributed personal video server 280, in one exemplary embodiment, the personal video service manager 230 sends the personal video asset from the centralized personal video content server 220 via a transmitter 240 to a receiver 260 that services the service group to which the requesting cable subscriber 295 belongs. The receiver 260 receives the personal video asset and stores the personal video asset on the distributed personal video server 280. The personal video service manager 230 then connects the cable subscriber 295 with the distributed personal video server 280. In another exemplary embodiment of the present invention, if the personal video asset is stored on a centralized personal video content server 220, then the personal video service manager 230 connects the requesting cable subscriber 295 to the centralized personal video content server 220.

The exemplary personal video network 200 also comprises service combination points 290a, 290b, 290c, 290d where personal video assets are combined with other cable services. For example, cable broadcast channels can be combined with personal video assets on the same broadband multiplex. In this way, a variety of cable services may be combined at various points in the personal video network 200.

Certain steps in the processes described below in connection with FIG. 3 through FIG. 5 must naturally precede others for the present invention to function as described. However, the present invention is not limited to the order of the steps described, if such order or sequence does not alter the functionality of the present invention. It is recognized that some steps may be performed before or after other steps without departing from the scope and the spirit of the present invention.

Figure 3:
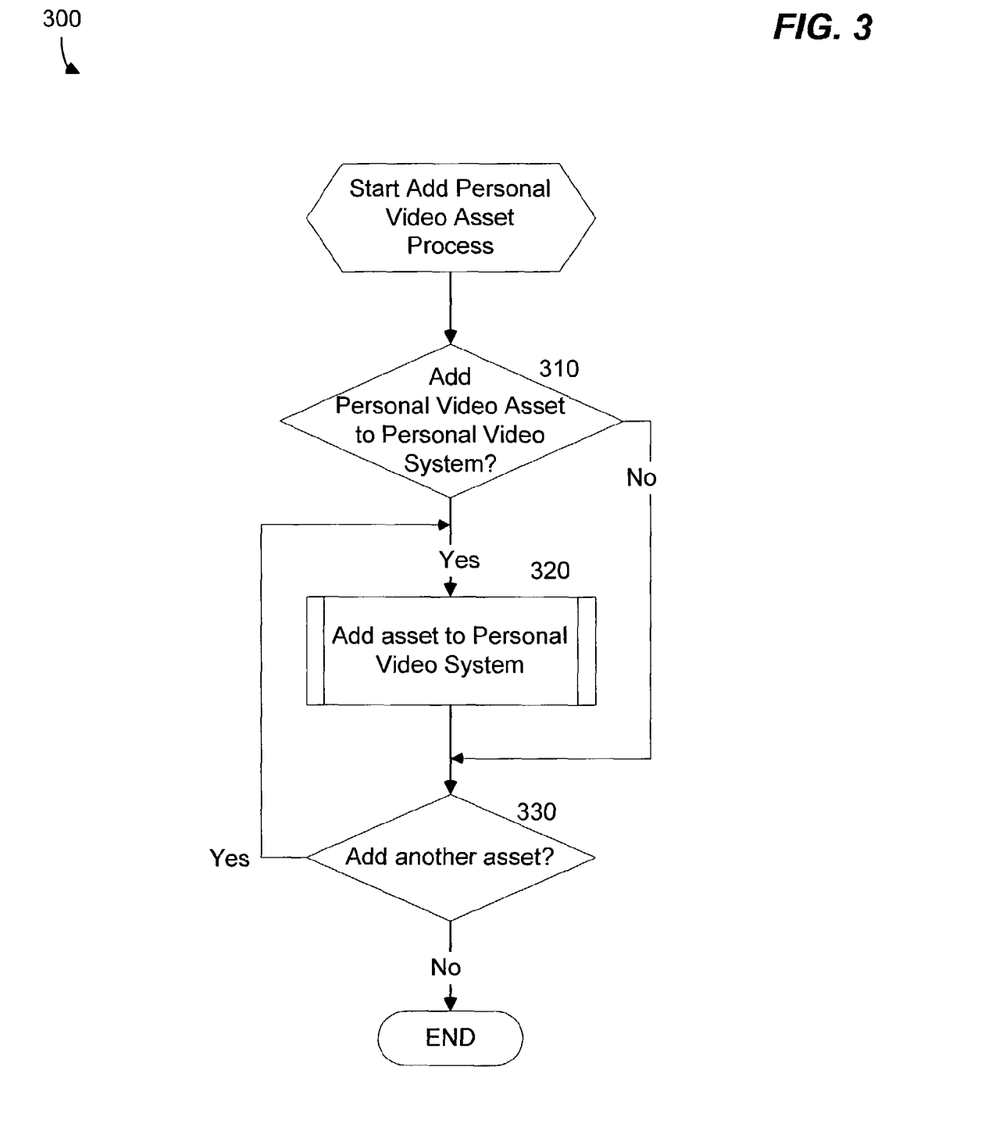
FIG. 3 is a logic flow diagram illustrating an exemplary process for adding personal video assets to a personal video network in accordance with one exemplary embodiment of the present invention.

FIG. 3 is a logic flow diagram illustrating an exemplary process 300 for adding personal video assets to a personal video network 200. Step 310 is the first step in the exemplary process 300. In Step 310, the personal video service manager 230 determines whether a personal video asset is to be added to the personal video network 200. In one exemplary embodiment of the present invention, if a particular television episode currently aired by the cable headend is to be available as a personal video asset, the personal video service manager 230 instructs the processing and recording equipment 210 to record and format the aired episode as a personal video asset. Exemplary processing and recording equipment 210 comprise a broadcast segment processor 210a, a real-time encoder 210b, a personal video exchange server 210c, and a live spool 210e. An exemplary segment processor 210a extracts a portion of a broadcast stream of a broadcast asset. An exemplary real time encoder 210b formats the broadcast stream into a format that allows the extracted portion of the broadcast asset to be viewed upon request by a cable subscriber 295. In one exemplary embodiment, the real time encoder 210b receives analog audio and video broadcast streams and converts the analog audio and video streams into MPEG video files and Dolby audio files. In another exemplary embodiment, the real time encoder 210b receives digital broadcast streams and formats the received digital broadcast stream to a compatible digital format for on-demand viewing by cable subscribers 295. The extracted and formatted portion of the broadcast asset can be stored in an exemplary personal video exchange server 210c.

If a personal video asset is to be added to the personal video network 200, then in Step 320, the personal video service manager 230 adds the personal video asset to the personal video network 200. In Step 330, the personal video service manager 230 determines whether another asset is to be added to the personal video network 200. If another personal video asset is to be added, then the process branches to Step 320. If no more assets are to be added to the personal video network 200, then the process ends.

Figure 4:
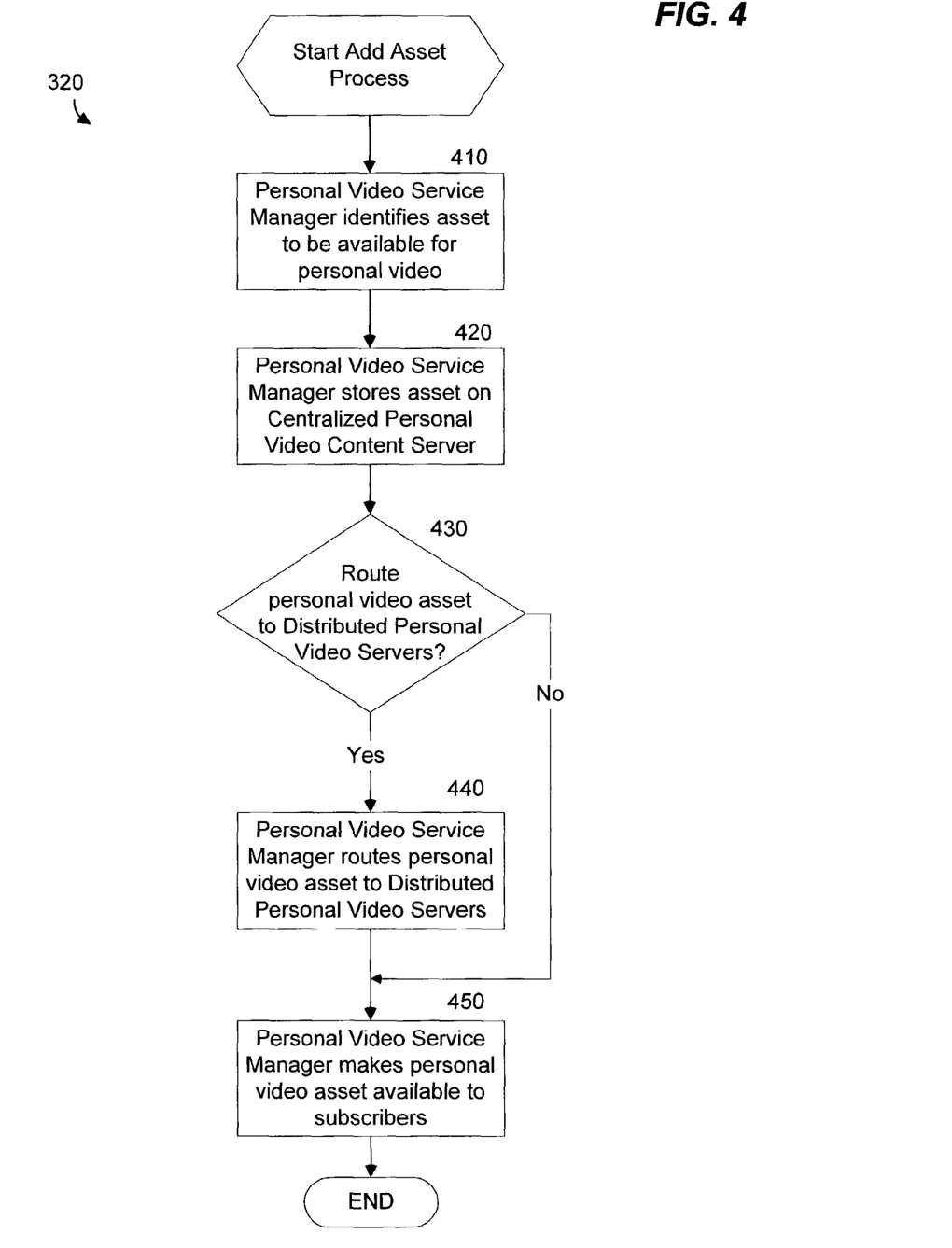
FIG. 4 is a logic flow diagram illustrating an exemplary sub-process of FIG. 3 for adding a personal video asset to the personal video network.

FIG. 4 is a logic flow diagram illustrating an exemplary sub-process or routine 320 for adding a personal video asset to the personal video network 200. Step 410 is the first step in the exemplary sub-process 320. In Step 410, the personal video service manager 230 identifies the asset that is to be available to cable subscribers 295 in the personal video network 200. In Step 420, the personal video service manager 230 stores the personal video asset on the centralized personal video content server 220. In Step 430, the personal video service manager 230 determines whether the personal video asset is to be sent to one or more distributed personal video servers 280. In one exemplary embodiment of the present invention, a personal video service manager 230 may decide which personal video assets to distribute from the centralized personal video content servers 220 to each distributed personal video server 280 depending upon the demographic of the service group associated with the distributed personal video server 280 or based upon the personal video assets that are typically requested by the service group associated with the distributed personal video server 280. In another exemplary embodiment, a personal video service manager 230 may distribute a personal video asset from the centralized personal video content server 220 to a distributed personal video server 280 only when a cable subscriber 295 serviced by the distributed personal video server 280 requests to view the personal video asset. In yet another exemplary embodiment, a personal video service manager 230 may distribute a personal video asset from the centralized personal video content server 220 to a distributed personal video server 280 only when a certain number of cable subscribers 295 serviced by the distributed personal video server 280 request to view the personal video asset.

If the personal video asset is to be sent to one or more distributed personal video servers 280, then in Step 440, the personal video service manager 230 routes the personal video asset to the one or more distributed personal video servers 280. In one exemplary embodiment of the present invention, the personal video service manager 230 can multicast, broadcast, or unicast the personal video asset to one or more distributed personal video servers 280. In another exemplary embodiment, the personal video service manager 230 can send the personal video asset to the distributed personal video servers 280 using File Transfer Protocol (FTP) or other communication protocols. In Step 450, the personal video service manager 230 makes the personal video asset available for viewing to cable subscribers 295. In one exemplary embodiment, the personal video service manager 230 makes the personal video asset available to cable subscribers 295 by updating an interactive program guide to reflect that the personal video asset is available to be selected for viewing.

Figure 5:
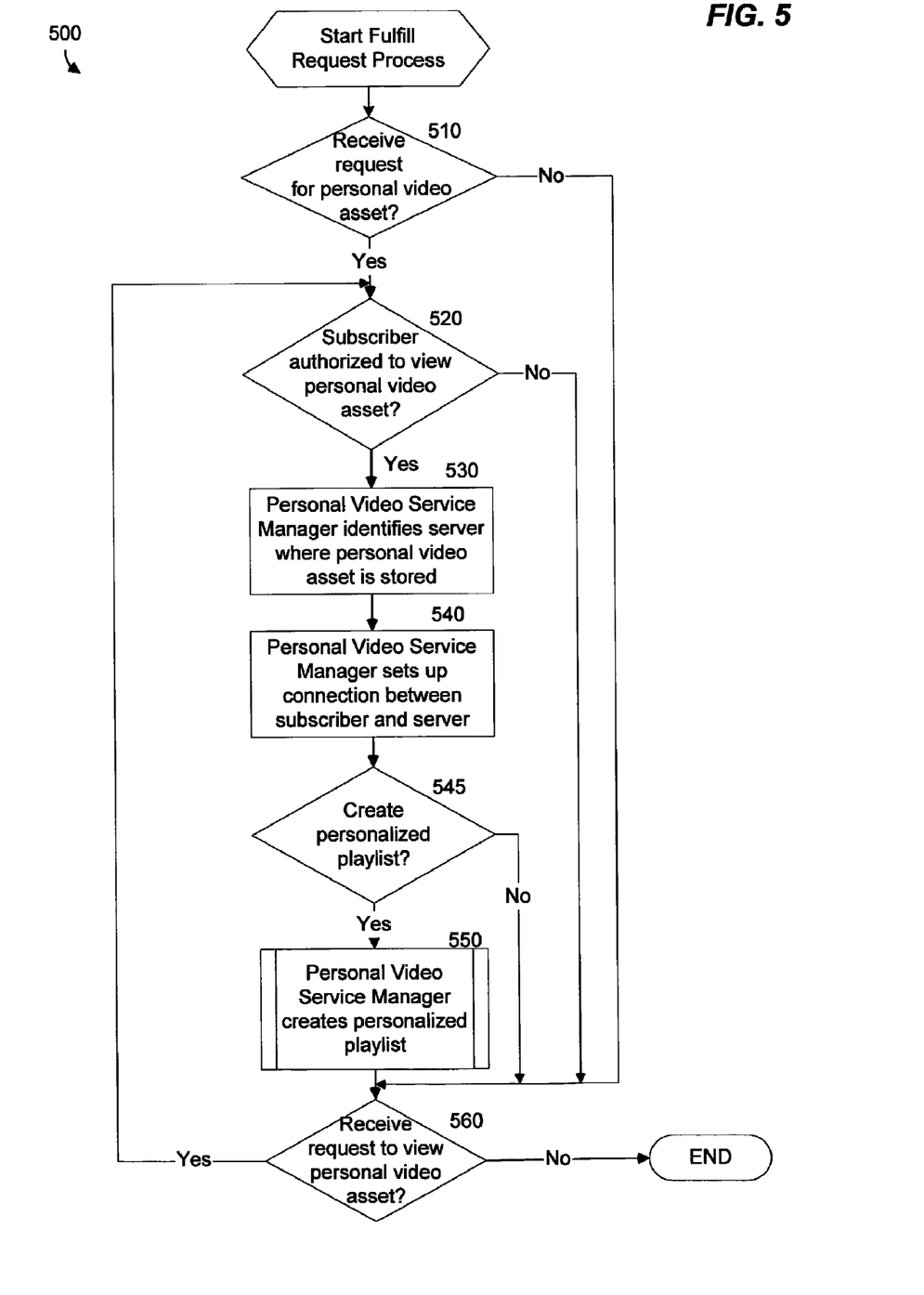
FIG. 5 is a logic flow diagram illustrating an exemplary process for distributing a personal video asset to a cable subscriber upon receiving a request from the cable subscriber to view the personal video asset in accordance with one exemplary embodiment of the present invention.

FIG. 5 is a logic flow diagram illustrating an exemplary process 500 for distributing a personal video asset to a cable subscriber 295 upon receiving a request from the cable subscriber 295 to view the personal video asset. Step 510 is the first step in the exemplary process. In Step 510, the personal video service manager 230 determines whether it has received a request from a cable subscriber 295 to view a personal video asset. If the personal video service manager 230 has received such a request, then in Step 520, the personal video service manager 230 determines whether the cable subscriber 295 is authorized to view the requested personal video asset. For example, whether a cable subscriber 295 is authorized to view a particular personal video asset may depend upon the cable subscriber's cable subscription. If the cable subscriber 295 is not authorized to view the personal video asset, then the process branches to Step 560. If the cable subscriber 295 is authorized, then in Step 530, the personal video service manager 230 determines on which server 220, 280 the personal video asset is stored. For example, the personal video asset may be stored on the one or more distributed personal video servers 280 that service the service group to which the cable subscriber 295 belongs. Additionally, the personal video asset may be stored on a centralized personal video content server 220.

In Step 540, the personal video service manager 230 sets up a connection between the cable subscriber 295 and the server 220, 280 on which the personal video asset is stored. If the personal video asset is stored on the distributed personal video server 280 that services the cable subscriber's service group, then the personal video service manager 230 sets up a connection between the distributed personal video server 280 and the cable subscriber 295. If the personal video asset is not stored on the distributed personal video server 280, in one exemplary embodiment, the personal video service manager 230 sends the personal video asset from the centralized personal video content server 220 via a transmitter 240 to a receiver 260 that services the service group to which the requesting cable subscriber 295 belongs. The receiver 260 receives the personal video asset and stores the personal video asset on the distributed personal video server 280. The receiver 260 multiplexes the personal video asset with other assets for that service group, performs quadrature amplitude modulation on the assets, and then converts the signals to the correct radio channel frequency. This channel is then combined with other radio frequency channels for delivery to the subscribers' 295 homes. The personal video service manager 230 then connects the cable subscriber 295 with the distributed personal video server 280. In another exemplary embodiment of the present invention, if the personal video asset is stored on a centralized personal video content server 220, then the personal video service manager 230 connects the requesting cable subscriber 295 to the centralized personal video content server 220.

In Step 545, the personal video service manager 230 determines whether it should create a personalized playlist. If the personal video service manager 230 determines that it should create a personalized playlist, then in Step 550, the personal video service manager 230 creates a personalized playlist.

In Step 560, the personal video service manager 230 determines whether it has received another request to view a personal video asset. If the personal video service manager 230 has received such a request, then the process branches to Step 520.

Figure 6:
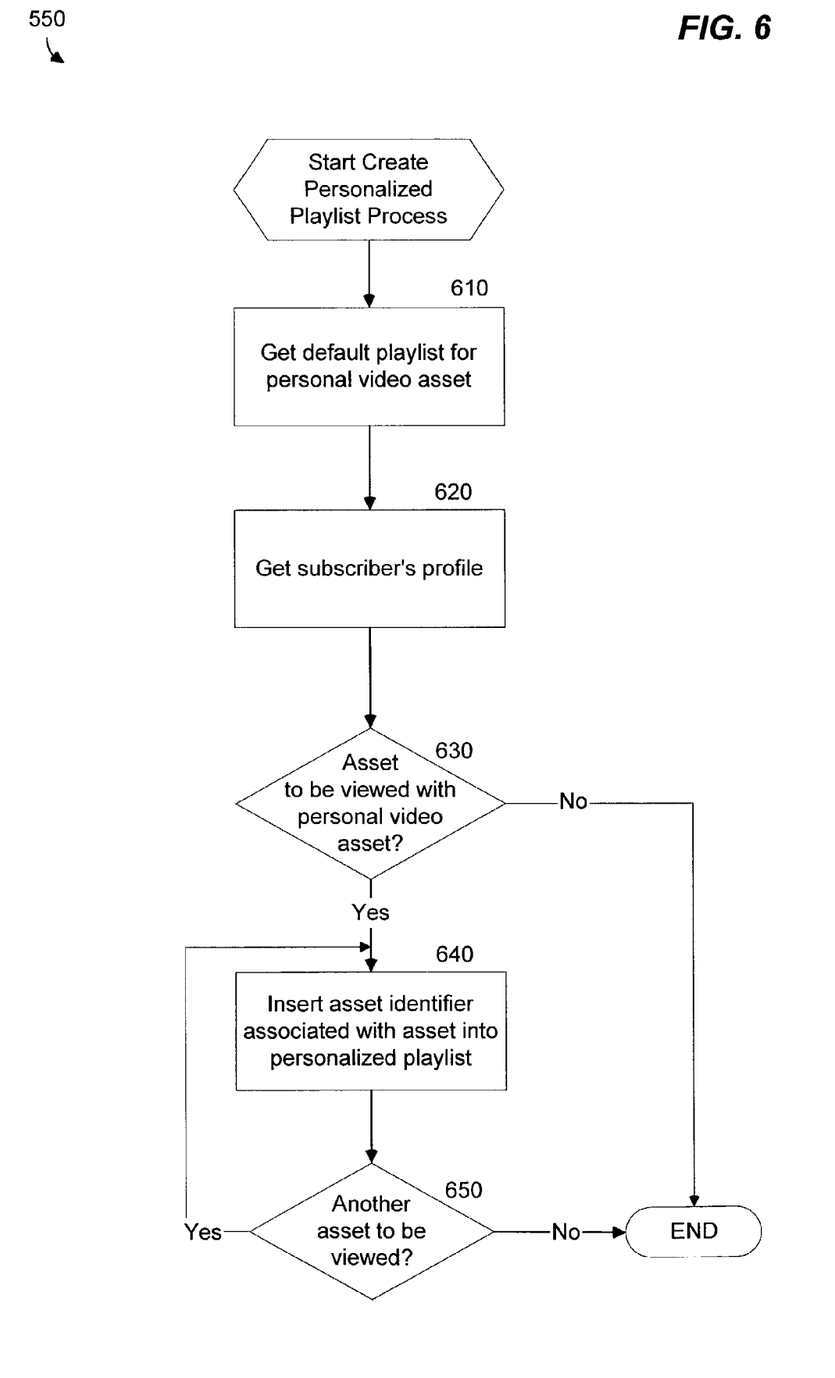
FIG. 6 is a logic flow diagram illustrating an exemplary sub-process of FIG. 5 for creating a personalized playlist in accordance with one exemplary embodiment of the present invention.

FIG. 6 is a logic flow diagram illustrating an exemplary sub-process or routine 550 of FIG. 5 for creating a personalized playlist. Step 610 is the first step in the exemplary sub-process 550. In Step 610, the personal video service manager 230 retrieves the default playlist for the personal video asset requested by the cable subscriber 295. In one exemplary embodiment, the default playlist for the personal video asset is packaged and stored with the personal video asset on a centralized personal video content server 220 or a distributed personal video server 280. In another exemplary embodiment, the default playlist is stored as part of the metadata package for the personal video asset on another storage device.

In Step 620, the personal video service manager 230 retrieves the profile of the cable subscriber 295 requesting the personal video asset. In one exemplary embodiment, the profile of each cable subscriber 295 is stored in a storage device local to (and managed by) the personal video service manager 230. In another exemplary embodiment, the profiles are stored in another storage device in the personal video network 200.

In Step 630, the personal video service manager 230 determines whether an asset, such as a targeted advertisement, should be viewed by the cable subscriber 295 with the requested personal video asset. For example, a personal video service manager 230 can select certain targeted advertisements to be viewed by the cable subscriber 295 with the requested personal video asset. If such an asset should be viewed with the personal video asset, in Step 640, the personal video service manager 230 inserts an asset identifier associated with the asset into the personalized playlist. In one exemplary embodiment, a personal video service manager 230 selects an asset (such as targeted advertising) to be viewed with the personal video asset based upon certain factors. Such factors can comprise the cable subscriber's personal profile, the personal video asset requested, and the viewing history of the cable subscriber 295. The personal video service manager 230 also defines in the personalized playlist the amount of control the cable subscriber 295 has in navigating through the personal video asset and the asset viewed with the personal video asset.

In Step 650, the personal video service manager 230 determines whether another asset should be viewed with the personal video asset. If another asset should be viewed, then the process branches to Step 640.

Those skilled in the art will appreciate that the exemplary personal video network 200 allows a cable subscriber 295 to select and view personal video assets on-demand at any time without first requiring the cable subscriber 295 to have recorded the personal video assets. For example, the exemplary personal video network 200 stores personal video assets for on-demand viewing on centralized personal video content servers 220 and distributed personal video servers 280. Additionally, those skilled in the art will appreciate that the exemplary personal video network 200 neither limits the amount of personal video assets that a cable subscriber 295 can view on-demand nor limits when the personal video assets can be viewed or recorded by a cable subscriber 295. Finally, those skilled in the art will appreciate that the exemplary personal video network 200 allows asset providers 10 and cable headends can maintain control over personal video assets by maintaining the personal video assets at centralized personal video content servers 220 and distributed personal video servers 280.

It should be understood that the foregoing relates only to illustrative embodiments of the present invention, and that numerous changes may be made therein without departing from the scope and spirit of the invention as defined by the following claims.

I claim:

1. A system for distributing a personal video asset to at least one subscriber via a video network, comprising:
   a server, operative to store the personal video asset, wherein the personal video asset comprises a recording of a broadcast stream of a broadcast asset and metadata that describes a format of the personal video asset, the metadata comprising a default playlist for the personal video asset, wherein the default playlist informs a personal video service manager how at least one other video asset is inserted into or associated with the personal video asset; and the personal video service manager, coupled to the video network, operative
to store the personal video asset on the server,
to create a personalized playlist from the default playlist that instructs the server how to assemble the personal video asset during playback, and
to facilitate a connection for distributing the personal video asset from the server to the subscriber upon receiving a request from the subscriber to receive the personal video asset.

2. The system for distributing a personal video asset of claim 1, further comprising:
a transmitter, operative to send the personal video asset to the subscriber via the video network upon receiving the request; and
a receiver, operative to receive the personal video asset from the transmitter via the video network and to distribute the personal video asset to the subscriber.

3. The system for distributing a personal video asset of claim 1, further comprising a broadcast segment processor, operative to record the broadcast stream of the broadcast asset and to format the recording as the personal video asset.

4. The system for distributing a personal video asset of claim 3, wherein the broadcast segment processor is further operative to record the broadcast stream of the broadcast asset in response to receiving a request from the personal video service manager to record the broadcast stream.

5. The system for distributing a personal video asset of claim 1, wherein the server comprises a distributed personal video server, operative to service at least one group of subscribers and to receive the personal video asset via the video network from the personal video service manager.

6. The system for distributing a personal video asset of claim 1, wherein the personal video service manager is further operative to receive an asset from an asset provider, wherein the asset is pre-authored by the asset provider in a personal video asset format.

7. The system for distributing a personal video asset of claim 1, wherein the personalized playlist further identifies how the subscriber can navigate through the personal video asset and the other video asset.

8. A system for distributing a selected one of a plurality of personal video assets to a subscriber via a video network, comprising:
a plurality of servers, operative to store the personal video assets, wherein each personal video asset comprises a recording of a broadcast stream of a broadcast asset and metadata that describes a format of the personal video asset, the metadata comprising a default playlist for the personal video asset, wherein the default playlist informs a personal video service manager how at least one other video asset is inserted into or associated with the personal video asset; and
a personal video service manager, coupled to the video network, operative
to manage the personal video assets stored on the servers,
to create a playlist from the default playlist that instructs the server how to assemble the personal video asset during playback, and
upon receiving a request from the subscriber to receive the selected personal video asset, operative to identify a selected one of the plurality of servers that stores the selected personal video asset and to facilitate a connection between the subscriber and the selected server for distributing the selected personal video asset to the subscriber.

9. The system of claim 8, further comprising:
a transmitter, operative to send the selected personal video asset via the video network to the subscriber; and
a receiver, operative to receive the selected personal video asset from the transmitter via the video network and to distribute the selected personal video asset to the subscriber.

10. The system of claim 8, further comprising a broadcast segment processor, operative to record the broadcast stream of the broadcast asset and to format the recording as the personal video asset in response to receiving a request from the personal video service manager to record the broadcast stream.

11. A method for managing a personal video asset, comprising the steps of:
recording an identified broadcast asset from a broadcast stream and formatting the recorded broadcast asset as the personal video asset, the personal video asset further comprising metadata that describes a format of the personal video asset, the metadata comprising a default playlist for the personal video asset, wherein the default playlist informs a personal video service manager how at least one other video asset is inserted into or associated with the personal video asset;
storing the formatted personal video asset on a selected one of a plurality of servers;
creating a playlist from the default playlist that instructs the server how to assemble the personal video asset during playback; and
facilitating a connection between a subscriber and the selected server upon receiving a request from the subscriber to view the personal video asset.

12. The method for managing a personal video asset of claim 11, wherein the facilitating step comprises the steps of:
identifying the selected server that stores the personal video asset; and
distributing the personal video asset from the selected server to the subscriber via a video network.

13. The method for managing a personal video asset of claim 12, wherein the distributing step comprises the steps of:
retrieving the personal video asset from the selected server; and
sending the personal video asset from a transmitter via the video network.

14. The method for managing a personal video asset of claim 12, further comprising the steps of:
determining whether to distribute the personal video asset to at least one distributed personal video server; and
sending the personal video asset to the at least one distributed personal video server via the video network, if the personal video asset is to be distributed to the distributed personal video server.

15. A method for managing a plurality of personal video assets, comprising the steps of:
formatting a recording of a broadcast stream of a broadcast asset as a selected one of the plurality of personal video assets, each of the personal video assets further comprising metadata that describes a format of each personal video asset, the metadata comprising a default playlist for each personal video asset, wherein the default playlist informs a personal video service manager how at least one other video asset is inserted into or associated with each personal video asset;
receiving a request to view the selected personal video asset;
identifying a server that stores the selected personal video asset;

creating a playlist from the default playlist that instructs the server how to assemble the personal video asset during playback;

inserting at least one other asset into the personal video asset in accordance with the personalized playlist; and facilitating a connection between the server and an entity issuing the request.

16. The method of claim 15, comprising the step of storing each personal video asset on at least one of a plurality of servers.

17. The method of claim 15, comprising the steps of:

distributing the personal video asset to at least one of a plurality of distributed personal video servers; and storing the personal video asset on the at least one distributed personal video server.

18. The method of claim 15, wherein the server comprises a centralized personal video content server.

19. The method of claim 17, wherein the server comprises the distributed personal video server.

20. The method of claim 15, comprising the step of recording the broadcast stream of the broadcast asset in response to receiving a request to record the broadcast stream.

21. The method of claim 15, wherein at least one of the plurality of personal video assets comprises a pre-authored personal video asset received from an asset provider.

22. A system for distributing a personal video asset to at least one subscriber via a video network, comprising:

a server, operative to store the personal video asset, wherein the personal video asset comprises a recording of a broadcast stream of a broadcast asset and metadata that describes a format of the personal video asset, the metadata comprising a default playlist for the personal video asset, wherein the default playlist informs a personal video service manager how at least one other video asset is inserted into or associated with the personal video asset;

a broadcast segment processor, operative to record the broadcast stream of the broadcast asset and to format the recording as the personal video asset; and a personal video service manager, coupled to the video network, operative to store the personal video asset on the server, to create a personalized playlist from the default playlist that instructs the server how to assemble the personal video asset during playback and inserts at least one other asset into the personal video asset in accordance with the personalized playlist, and to facilitate a connection for distributing the personal video asset from the server to the subscriber upon receiving a request from the subscriber to receive the personal video asset.

23. The system for distributing a personal video asset of claim 22, wherein the broadcast segment processor is further operative to record the broadcast stream of the broadcast asset in response to receiving a request from the personal video service manager to record the broadcast stream.

24. The system for distributing a personal video asset of claim 22, wherein the server comprises a distributed personal video server, operative to service at least one group of subscribers and to receive the personal video asset via the video network from the personal video service manager.

25. The system for distributing a personal video asset of claim 22, wherein the personal video service manager is further operative to receive a pre-authored personal video asset from an asset provider.

26. The system for distributing a personal video asset of claim 22, wherein the personalized playlist comprises an index that indicates each location in the personal video asset where the at least one other video asset may be inserted during playback.

27. The system for distributing a personal video asset of claim 22, wherein the personal video service manager determines whether to insert the at least one other video asset based on the personal video asset requested and the subscriber's subscription service.

28. The system for distributing a personal video asset of claim 1, wherein the personalized playlist comprises an index that indicates each location in the personal video asset where the at least one other video asset may be inserted during playback.

29. The system for distributing a personal video asset of claim 1, wherein the personal video service manager determines whether to insert the at least one other video asset based on the personal video asset requested and the subscriber's subscription service.

30. The system for distributing a personal video asset of claim 1, wherein the personal video service manager determines whether to insert the at least one other video asset based on instructions received from an asset provider.

\* \* \* \* \*